(12) United States Patent
Lubyanskyy

(10) Patent No.: US 10,698,673 B2
(45) Date of Patent: Jun. 30, 2020

(54) MANAGING SOFTWARE INSTALLATION

(71) Applicant: Red Hat, Inc., Raleigh, NC (US)

(72) Inventor: Oleksiy Lubyanskyy, Neuchatel (CH)

(73) Assignee: RED HAT, INC., Raleigh, NC (US)

( * ) Notice: Subject to any disclaimer, the term of this patent is extended or adjusted under 35 U.S.C. 154(b) by 98 days.

(21) Appl. No.: 15/958,748

(22) Filed: Apr. 20, 2018

(65) Prior Publication Data
US 2019/0324733 A1 Oct. 24, 2019

(51) Int. Cl.
*G06F 8/61* (2018.01)
*G06F 8/71* (2018.01)
*G06F 8/76* (2018.01)
*G06F 9/445* (2018.01)
*G06F 40/14* (2020.01)
(Continued)

(52) U.S. Cl.
CPC ............ *G06F 8/61* (2013.01); *G06F 8/71* (2013.01); *G06F 8/76* (2013.01); *G06F 9/44505* (2013.01); *G06F 40/117* (2020.01); *G06F 40/14* (2020.01); *H04L 67/34* (2013.01)

(58) Field of Classification Search
CPC ..................................... G06F 8/61; G06F 8/71
USPC .................................................. 717/168–178
See application file for complete search history.

(56) References Cited

U.S. PATENT DOCUMENTS 5,794,052 A * 8/1998 Harding .................. G06F 9/454
  717/178
5,931,909 A * 8/1999 Taylor ....................... G06F 8/61
  709/221
6,301,708 B1 10/2001 Gazdik et al.
(Continued)

FOREIGN PATENT DOCUMENTS

| CN | 102736923 B | 11/2015 |
|---|---|---|
| GB | 2466220 A | 6/2010 |
| WO | 2017/071494 A1 | 4/2017 |

OTHER PUBLICATIONS

Bruno, Greg, et al. "Rolls: modifying a standard system installer to support user-customizable cluster frontend appliances." 2004 IEEE International Conference on Cluster Computing (IEEE Cat. No. 04EX935). IEEE, 2004.pp. 421-430 (Year: 2004).*
(Continued)

*Primary Examiner* — Satish Rampuria
(74) *Attorney, Agent, or Firm* — Kilpatrick Townsend & Stockton LLP

(57) ABSTRACT

Software installations can be managed. For example, a first installation package for installing a first software product can be received. The first installation package can include a first set of configuration files indicating a first default configuration for the first software product using a generic format. A second installation package for installing a second software product can also be received. The second installation package can include a second set of configuration files indicating a second default configuration for the second software product using the generic format. A configuration dataset can be determined from the first set of configuration files and the second set of configuration files by merging first configuration data in the first set of configuration files and second configuration data in the second set of configuration files. The first software product and the second software product can then be installed using the configuration dataset.

20 Claims, 5 Drawing Sheets

(51) Int. Cl.
*G06F 40/117* (2020.01)
*H04L 29/08* (2006.01)

(56) References Cited

U.S. PATENT DOCUMENTS

| | | | | |
|---|---|---|---|---|
| 6,381,742 B2 * | 4/2002 | Forbes | ................... | G06F 8/61 |
| | | | | 707/999.202 |
| 6,865,737 B1 * | 3/2005 | Lucas | ................... | G06F 8/61 |
| | | | | 717/178 |
| 6,996,815 B2 | 2/2006 | Bourke-Dunphy et al. | | |
| 8,074,214 B2 | 12/2011 | Isaacson et al. | | |
| 8,255,904 B2 * | 8/2012 | Sheppard | ................... | G06F 8/61 |
| | | | | 717/177 |
| 8,352,935 B2 | 1/2013 | Isaacson et al. | | |
| 8,924,954 B2 * | 12/2014 | Wang | ................... | G06F 9/45504 |
| | | | | 717/168 |
| 2002/0013939 A1 * | 1/2002 | Daynes | ................... | G06F 8/61 |
| | | | | 717/170 |
| 2003/0023966 A1 * | 1/2003 | Shimizu | ................... | G06F 8/61 |
| | | | | 717/175 |
| 2004/0177352 A1 * | 9/2004 | Narayanaswamy | ...... | G06F 8/61 |
| | | | | 717/169 |
| 2005/0198629 A1 * | 9/2005 | Vishwanath | ............... | G06F 8/61 |
| | | | | 717/174 |
| 2006/0123414 A1 * | 6/2006 | Fors | ................... | G06F 8/61 |
| | | | | 717/177 |
| 2006/0253848 A1 | 11/2006 | Mathieu et al. | | |
| 2007/0169114 A1 | 7/2007 | Olsen et al. | | |
| 2007/0233717 A1 | 9/2007 | Boersma | | |
| 2007/0277170 A1 * | 11/2007 | Kapoor | ................... | G06F 8/61 |
| | | | | 717/174 |
| 2008/0127171 A1 | 5/2008 | Tarassov | | |

OTHER PUBLICATIONS

Krueger, Charles W. "Software mass customnization." White paper, Oct (2001).pp. 1-16 (Year: 2001).*

Anzböck, Rainer, Schahram Dustdar, and Harald Gall. "Software configuration, distribution, and deployment of web-services." Proceedings of the 14th international conference on Software engineering and knowledge engineering. ACM, 2002.pp. 649-656 (Year: 2002).*

Oetiker, Tobias. "SEPP: Software Installation and Sharing Systenn." LISA. 1998.pp. 253-260 (Year: 1998).*

Lucas Jr, Henry C., Eric J. Walton, and Michael J. Ginzberg. "Implementing packaged software." MIS quarterly (1988): pp. 537-549. (Year: 1988).*

Bouchenak, Sara, et al. "Autonomic management of clustered applications." 2006 IEEE International Conference on Cluster Computing. IEEE, 2006.pp. 1-11 (Year: 2006).*

* cited by examiner

202

```
<installation-pack   version="12.0.0.Alpha1-SNAPSHOT"   artifactId="wildfly-feature-pack-new" groupId="org.wildfly"/>
    <config name="standalone.xml" model="standalone">
        <exclude spec="subsystem.mail"/>    # Exclude subsystem.mail feature
        <feature spec="interface">          # Include interface feature
            <param name="interface" value="my-first-interface"/>
            <param name="inet-address" value="localhost"/>
        </feature>
    </config>
</installation-pack>
```

204

```
<interfaces>
    <interface name="management">
        <inet-address value="${jboss.bind.address.management:127.0.0.1}"/>
    </interface>
    <interface name="public">
        <inet-address value="${jboss.bind.address:127.0.0.1}"/>
    </interface>
    <interface name="my-first-interface">
        <inet-address value="localhost"/>
    </interface>
</interfaces>
```

FIG. 2

MANAGING SOFTWARE INSTALLATION

TECHNICAL FIELD

The present disclosure relates generally to software installation. More specifically, but not by way of limitation, this disclosure relates to managing software installation.

BACKGROUND

A computing device can install a software product (e.g., a game, utility application, etc.) using an installation package. The installation package typically includes various files, such as text files and binary files, for installing the software product. The installation package also typically includes an executable installation tool for installing the software product.

BRIEF DESCRIPTION OF THE DRAWINGS

FIG. 2 is an example of a translation performed by a plugin according to some aspects.

DETAILED DESCRIPTION

Figure 1:
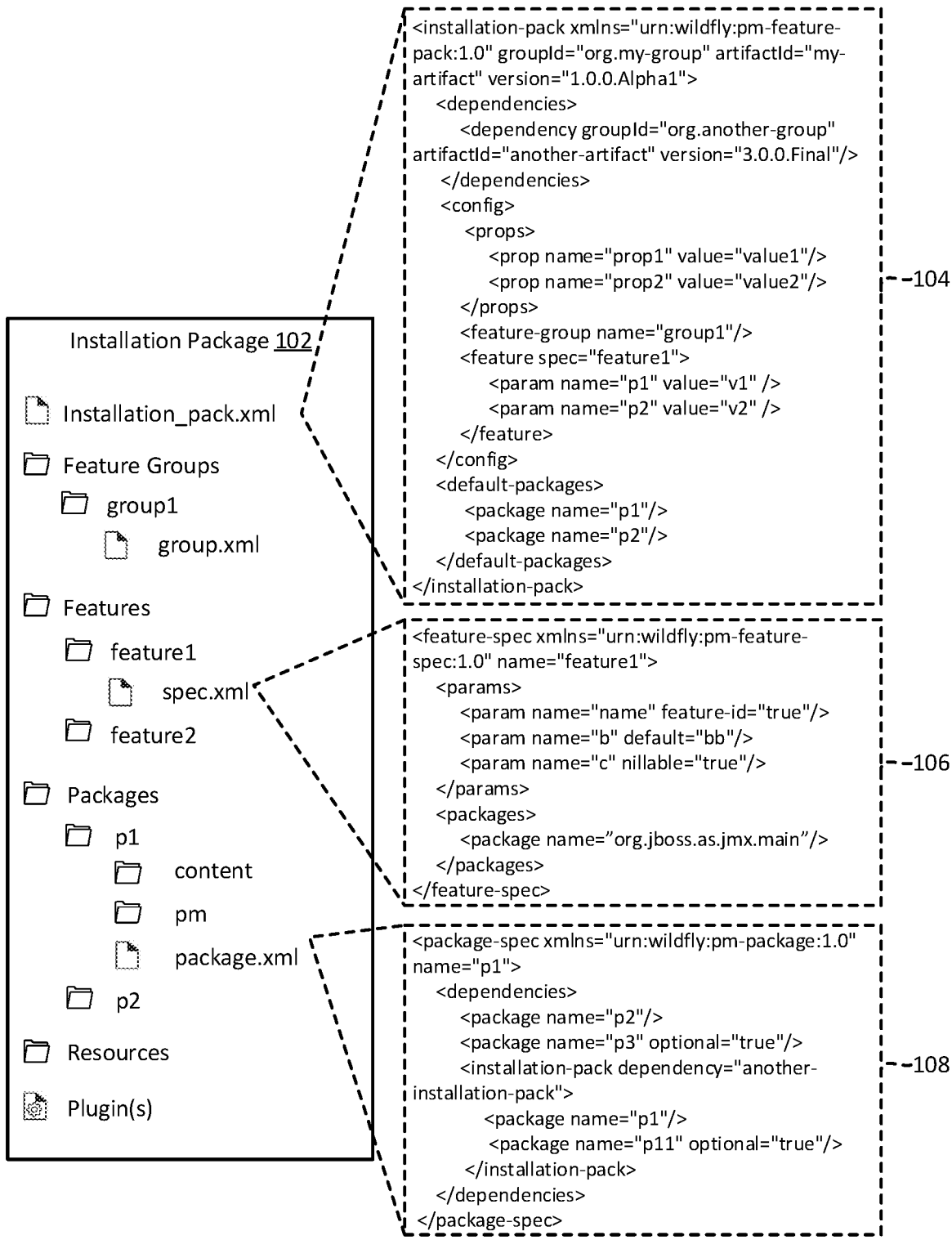
FIG. 1 is a block diagram of an example of an installation package according to some aspects.

Installation packages are created by a wide variety of vendors, resulting in installation packages having different installation tools, file formats, configuration settings, and other characteristics. These different characteristics can create numerous problems. For example, a user may wish to install several software-products at the same time. These software products can be interdependent, but created by different development teams or vendors. For example, one software product can be a load balancer for an application server, such as WildFly™ by Red Hat™. Another software product can be a failover handler for the application server. But the installation packages for these software products may have configuration files with different formats and settings from one another, which can lead to a variety of interoperability and configuration problems. For example, this can result in duplicates of files being unnecessarily installed, incompatible or suboptimal settings for the software products, lack of interoperability among the software products, circular dependencies, and other issues. This can also make it challenging for the user to customize the installation (e.g., to remove components, add components, modify components, or modify settings for components) more easily, more holistically, and using a higher degree of detail than may otherwise be possible.

Some examples of the present disclosure can overcome one or more of the abovementioned issues by providing installation packages that have a common file structure and configuration files in a common, generic format. The generic format can be an extensible markup language (XML)-based format in which tags are used to designate various characteristics for a configuration (e.g., a default configuration) of a software product. As a particular example, the generic format can include "<dependencies></dependencies>" tags indicating file dependencies or other installation-package dependencies to be included in the configuration, "<default-packages></default-packages>" tags indicating the default binary-packages to be included in the configuration, "<feature spec></feature>" tags indicating features to be included in the configuration, "<param>" tags indicating values of parameters to be set in the configuration, or any combination of these. Binary packages can be the smallest individual units of filesystem content that can be included in (or excluded from) an installation of a software product. A feature can be a segment of configurable content in a configuration file that provides certain software functionality. Providing the configuration files in this generic format can enable a software installation tool can more easily ingest, analyze, and validate configuration files from different installation packages to reduce or eliminate the interoperability and configuration issues discussed above.

Some example of the present disclosure can also include the software installation tool discussed above. The software installation tool can obtain the configuration files from one or more software packages and more-holistically analyze the content of the configuration files due to their generic format. As a particular example, the software installation tool can extract configuration data from the configuration files, merge duplicate information in the configuration data (e.g., to delete duplicates of settings, dependencies, and other information), and collocate related information in the configuration data. This can reduce the size and complexity of the configuration data, reducing the random access memory (RAM) containing the configuration data. This can also prevent duplicates of files (e.g., dependencies) from being installed on the computer, thereby saving the computer's disk space.

The software installation tool can also accept user customizations to the configuration data and more easily implement the user customizations due to the generic format of the configuration data. For example, a user customization can involve changing a certain parameter's value from 0 to 1 everywhere that the parameter has a value of 0 in the configuration data. Due to the generic format of the configuration data, the software installation tool can easily identify all of the locations in which the parameter's value is 0 and change the parameter's value to 1 in the configuration data. In contrast, if the installation packages had configuration files with different formats (e.g., different naming structures and syntaxes), it would be challenging or impossible for a software installation tool to perform this functionality.

After adjusting the configuration data for user customizations, the software installation tool can validate the configuration data. This can involve checking the configuration data to ensure that it satisfies one or more predefined conditions. For example, the software installation tool can check the configuration data to ensure that all required dependencies are present, that various settings or parameter values do not conflict, that files and file locations do not conflict, or any combination of these. The software installation tool can flag any issues for review by the user or, if no issues are present, proceed to install the software products in accordance with the configuration data.

In some examples, the validated configuration-data may need to be translated from the generic format into a product-specific format to enable a software product to be properly installed. So, some examples can include a plugin capable of performing this translation. The plugin may be created by a developer of the installation package and included in the installation package, a plugin repository, or elsewhere for use by the software installation tool. The plugin can include a lookup table (or a set of rules) for translating the configuration data from the generic format into a product-specific format usable to install the software product. The software installation tool can invoke the plugin during the installation process to perform this translation. The plugin can perform this translation and produce a final configuration-file in the product-specific format (e.g., at a particular location on the computer's filesystem associated with the installation). At the same time, the software installation tool can copy the relevant files (e.g., binary files) from the installation package to various locations on the computer's filesystem associated with the installation. In some such examples, the plugin's functionality may be limited to only performing the above-mentioned translation, which can reduce the size and complexity of the plugin.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of an installation package 102 according to some aspects. The installation package 102 is an archive of files. In some examples, the installation package 102 can be a compressed archive of files, such as a ZIP or RAR file.

The installation package 102 has various files and folders arranged in a predefined file-structure. In this example, the predefined file-structure includes a main directory with a Feature Groups folder, a Features folder, a Packages folder, a Resources folder, and a main configuration-file (e.g., "Installation_pack.xml"). The Feature Groups folder can include descriptions of feature groups. The Feature folder can include descriptions of features that are includable or excludable from a configuration. The Packages folder can include content packages that can be installed. The Resources folder can include various resources for properly setting up the installation. Some or all of these folders can also have sub-directories. For each, each feature group in the Feature Groups folder has its own subdirectory (e.g., "group1") and a sub-configuration file (e.g., "group.xml"). As another example, each feature in the Features folder has its own subdirectory (e.g., "feature1" and "feature2") and sub-configuration file (e.g., "spec.xml"). As yet another example, each content package in the Packages folder has its own sub-directories and sub-configuration file (e.g., "package.xml"). In this example, each content package can have a "content" subdirectory and a "pm" subdirectory. The "content" subdirectory can include the content (e.g., binary files) of the package to be copied when the software package is installed. The "pm" subdirectory can include various resources for properly provisioning the content of the package. The file structure shown in FIG. 1 is illustrative, but other examples can use other file structures with different combinations of files and folders.

Some or all of the configuration files in the installation package 102 can be in a generic format. An example of the generic format is shown in box 104, which depicts the general-configuration data in Installation_pack.xml in some examples. The general-configuration data can include "<installation-pack></installation-pack>" tags indicating the beginning and end of the general-configuration content. The "<installation-pack>" tag can include various values, such as a groupID indicating a group associated with the installation package 102, an artifactID indicating an artifact associated with the installation package 102, and a version indicating a version of the installation package 102. The general-configuration data can also include "<dependencies></dependencies>" tags indicating the beginning and end of dependency information. The dependency information can express one or more other installation packages on which this installation package 102 relies. Each dependency can be specified using a "<dependency>" tag with various values, such as a groupID indicating a group associated with the dependency, an artifactID indicating an artifact associated with the dependency, and a version indicating a version of the dependency.

In some examples, the general-configuration data can include "<config></config>" tags indicating the beginning and end of more-specific configuration information. Between these tags can be "<props></props>" tags indicating the beginning and end of property information. The property information can express one or more properties for the installation. Each property can be specified using a "<prop>" tag with various values, such as a name and a value for the property. There can also be "<feature-group>" tags specifying feature-group information. The feature-group information can express one or more feature groups to be included in the configuration. A feature group can be a collection of several features in a single file (e.g., "group.xml") to enable the features to all be included, excluded, or manipulated together. This can simplify the manipulation of multiple features that are interrelated or dependent. There can also be "<feature spec></feature>" tags specifying the beginning and end of feature information. The feature information can indicate an individual feature to be incorporated into the configuration. The feature information can also express parameter settings for the feature. Each parameter setting can be specified using a "<param>" tag with various values, such as a name and a value for the parameter. In some examples, the general-configuration data can include "<default-packages></default-packages>" tags indicating the beginning and end of default-package information. The default-package information can express one or more content packages to include by default in an installation. Each content package can be specified using a "<package>" tag with various values, such as a name of the content package.

As discussed above, the main configuration-file (e.g., Installation_pack.xml) can incorporate one or more features by reference, such as feature1. Each feature can be described via feature-configuration data in a separate file, such as spec.xml in the feature1 subdirectory. An example of the feature-configuration data is shown in box 106. As shown, this feature-configuration data is in the generic format. The feature-configuration data can include "<feature-spec></feature-spec>" tags indicating the beginning and end of the feature-configuration content. These tags can include a name for the feature. Within these tags can be "<params></params>" tags indicating the beginning and end of parameter information. The parameter information can express one or more parameter settings for the feature. Each parameter setting can be specified using a "<param>" tag with various values, such as a name, a feature-id setting indicating whether or not the parameter is part of the feature ID, a default setting indicating a default value to be used for the parameter if the parameter is not explicitly initialized in the configuration, a nillable setting indicating whether the parameter allows null as the value, or any combination of these. In some examples, the feature-configuration data can include "<packages></packages>" tags indicating the beginning and end of package information. The package information can express one or more content packages relied on by the feature. Each content package can be specified using a "<package>" tag with various values, such as a name. In some examples, the feature-configuration data can include "<provides></provides>" tags (not shown in FIG. 1) indicating the beginning and end of capability information. The capability information can express one or more functional capabilities provided by the feature. Each capability can be specified using a "<capability>" tag with various values, such as a name.

The main configuration-file can also reference one or more content packages, such as p1, to be included by default in an installation. Each content package can have its own package-configuration data in its own file, such as package.xml in the p1 subdirectory. An example of package-configuration data is shown in box 108. As shown, this package-configuration data is also in the generic format. The package-configuration data can include "<package-spec></package-spec>" tags indicating the beginning and end of the package-configuration data. These tags can include a name for the content package. Within these tags can be "<dependencies></dependencies>" tags indicating the beginning and end of dependency information. The dependency information can express one or more other content packages (e.g., p2) or installation packages on which this content package relies. Dependencies on other content packages can be specified using a "<package>" tag with various values, such as a name and an optional setting indicating whether the dependency is required or optional for an installation. Dependencies on another installation package can be specified using "<installation-pack></installation-pack>" tags. Between these tags can be references to additional content-packages within the other installation package to be included as dependencies.

The general-configuration data shown in box 104, the feature-configuration data shown in box 106, and the package-configuration data shown in box 108 are exemplary. Other examples can include more tags, fewer tags, different tags, or a different arrangement of the tags shown in FIG. 1. And the parameter values and settings discussed above for each tag are exemplary. Other examples can involve tags with more parameter-values, fewer parameter-values, different parameter-values, or a different arrangement of the parameter-values shown in FIG. 1. Additionally, while the above examples of the generic format are written using an XML-schema, other examples can involve different types of schema. The generic format can be any suitable format that is (i) common among multiple installation-packages, (ii) human readable, (iii) modular and scalable, and/or (iv) easily customizable.

In some examples, the installation package 102 can include one or more plugins. The plugin(s) can integrate with a software installation tool (not shown) for translating configuration data from the generic format into a product-specific format. The software installation tool is not included in the installation package 102, and is not specific to the installation package 102, as it would be in a traditional installation package. Instead, the software installation tool is a separate tool usable with any installation package that has configuration files in the generic format.

One example of a translation performed by a plugin is shown in FIG. 2. Box 202 depicts an example of general-configuration data in the generic format, as would be included in the Installation_pack.xml file. A plugin can obtain this general-configuration data and translate it into another format that may be required by the software product. For example, the plugin can translate the general-configuration data into the following product-specific format, as shown in box 204. After translating the general-configuration data into this product-specific format, the plugin can store the transformed data in a configuration file associated with the software product's installation.

In some examples, the configuration files and the plugin for an installation package 102 are created by a developer of the software product. For example, the developer can write the configuration files in the generic format and create the plugin to enable the software installation tool to install the software product.

Figure 3:
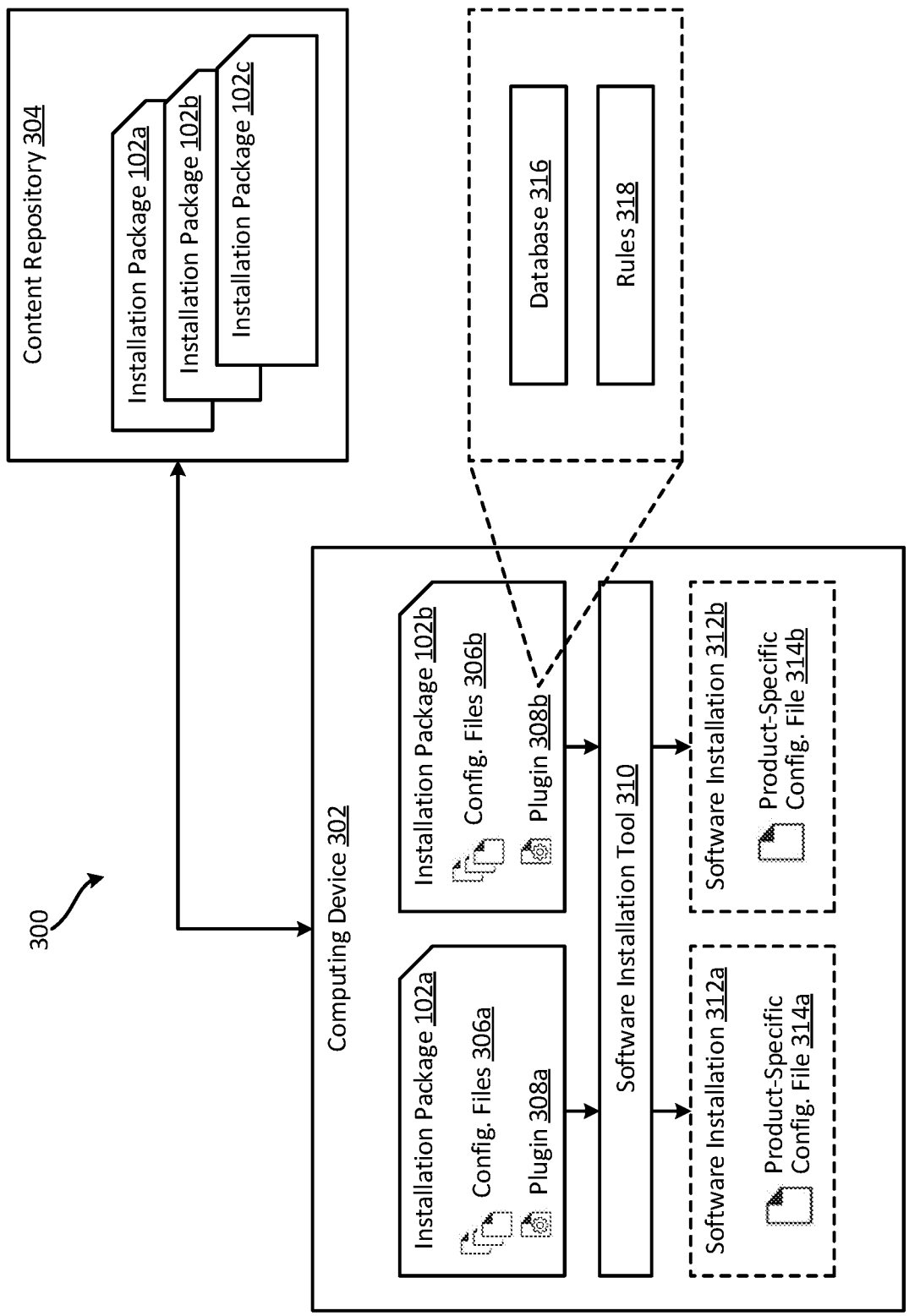
FIG. 3 is a block diagram of an example of a system for managing software installation according to some aspects.

FIG. 3 is a block diagram of an example of a system 300 for managing software installation according to some aspects. The system 300 includes a computing device, such as a server, desktop computer, laptop computer, or mobile device. The computing device 302 can be in communication with a content repository 304, which can include one or more installation packages 102a-c. The computing device 302 can download (e.g., via the Internet) any number and combination of installation packages 102a-b from the content repository 304.

The installation package 102a can include a set of configuration files 306a, and the installation package 102b can include another set of configuration files 306b. Each set of configuration files can include the main configuration-file and sub-configuration files discussed above with respect to FIG. 1. The installation packages 102a-b can also include plugins 308a-b, such as the plugins discussed above with respect to FIGS. 1-2. Alternatively, the plugins 308a-b can be separate from the installation packages 102a-b and obtained, for example, from another content repository. The installation packages 102a-b can also include other content, as discussed above with respect to FIG. 1.

The computing device 302 further includes a software installation tool 310. The software installation tool 310 can obtain the configuration files 306a-b from the installation packages 102a-b, analyze them, and produce software installations 312a-b based on the configuration files 306a-b. The software installations 312a-b may include copies of binary packages and other content from the installation packages 102a-b.

In some examples, a user may wish to install software products associated with the installation packages 102a-b at the same time. So, the user can activate the software installation tool 310 and specify that the software products are to be installed using the installation packages 102a-b. In response, the software installation tool 310 can obtain configuration data from the configuration files 306a-b and process the configuration data. Processing the configuration data can involve merging duplicate information in the configuration data (e.g., to delete duplicates of settings, dependencies, and other information), collocating related information in the configuration data, removing unnecessary or extraneous information in the configuration data, or any combination of these.

Thereafter, the software installation tool 310 can provide a representation of the configuration data to the user, via a display device, in a textual format or a graphical user interface (GUI). For example, the software installation tool 310 can provide a GUI with a list of dependencies, default packages, parameters, and other information that is manipulatable by the user. In some examples, the software installation tool 310 can receive user input indicating one or more user customizations. The software installation tool 310 can receive the user input via command line (e.g., as textual commands) or via the GUI. In response to the user input, the software installation tool 310 can modify the configuration data in accordance with the user customizations to generate a customized version of the configuration data. For example, the user customizations can be applied all of the configuration data, which collectively describes the configurations of both software products associated with both installation packages 102a-b. In this manner, the user can customize both configurations for both of the software products simultaneously.

In some examples, the software installation tool 310 can validate the configuration data by checking the configuration data to ensure that it satisfies one or more predefined conditions. For example, the software installation tool 310 can check the configuration data to ensure that (i) certain settings will not cause interoperability problems, (ii) certain functional capabilities are present, (iii) the order of steps in the configuration data is correct, (iv) or any combination of these. If the software installation tool 310 the configuration data does not satisfy the one or more predefined conditions, the software installation tool 310 can notify the user (e.g., by providing a visual alert to the user on the display device) that there is a problem. Otherwise, the software installation tool 310 can install the software products in accordance with the configuration data to produce the software installations 312a-b.

The software installation tool 310 may install the software products at least in part by using the plugins 308a-b to translate the configuration data from the generic format into product-specific formats. In some examples, each of the plugins 308a-b can include a database 316 for performing the translation. In one such example, the database 316 can include relationships between tags in the generic format and corresponding tags in the product-specific format. Additionally or alternatively, each of the plugins 308a-b can include a set of rules 318 for performing the translation. The rules 318 can include conditional statements (e.g., if-then-else) statements for converting the configuration data from the generic format into the product-specific format. The plugins 308a-b can perform the translations and store the resulting data in product-specific configuration files 314a-b associated with the software installations 312a-b. The software installation tool 310 can also copy the relevant files (e.g., binary files) from the installation packages 102a-b to various locations on the computing device 302 to produce the software installations 312a-b. The software installation tool 310 can perform the copying before, after, or concurrently with the plugins 308a-b performing the translations.

Although FIG. 3 shows two installation packages on the computing device 302, the computing device 302 can include any number and combination of installation packages. And the software installation tool 310 can process (e.g., together) any number and combination of installation packages to create any number and combination of software installations. Also, while the plugins 308a-b are described as separate components from the software installation tool 310, in other examples the software installation tool 310 can include the plugins 308a-b or can be capable of performing the functionality of the plugins 308a-b (e.g., the translations).

Figure 4:
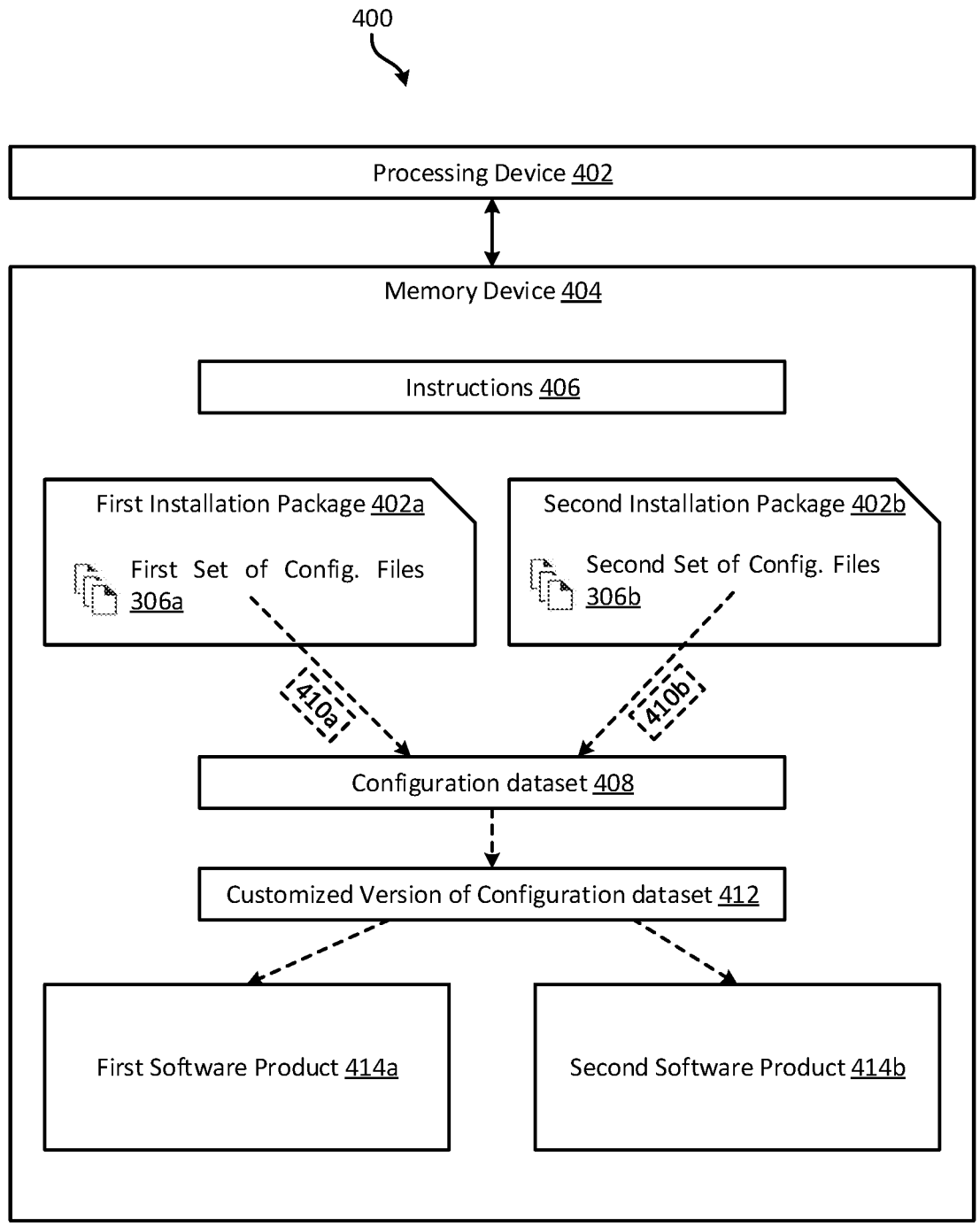
FIG. 4 is a block diagram of another example of a system for managing software installation according to some aspects.

FIG. 4 is a block diagram of another example of a system 400 for managing software installation according to some aspects. The system 400 includes a processing device 402 communicatively coupled to a memory device 404. In some examples, the processing device 402 and the memory device 404 can be housed in a single device, such as computing device 302. In other examples, the processing device 402 and the memory device 404 can be distributed from one another.

The processing device 402 can include one processing device or multiple processing devices. Non-limiting examples of the processing device 402 include a Field-Programmable Gate Array (FPGA), an application-specific integrated circuit (ASIC), a microprocessor, etc. The processing device 402 can execute instructions 406 stored in the memory device 404 to perform operations. In some examples, the instructions 306 can include processor-specific instructions generated by a compiler or an interpreter from code written in any suitable computer-programming language, such as C, Java, C++, C #, etc.

The memory device 404 can include one memory device or multiple memory devices. The memory device 404 can be non-volatile and may include any type of memory device that retains stored information when powered off. Non-limiting examples of the memory device 404 include electrically erasable and programmable read-only memory (EEPROM), flash memory, or any other type of non-volatile memory. In some examples, at least some of the memory device can include a medium from which the processing device 402 can read instructions 406. A computer-readable medium can include electronic, optical, magnetic, or other storage devices capable of providing the processing device 402 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 406.

In some examples, the memory device 404 can include a first installation package 402a with a first set of configuration files 306a and a second installation package 402b with a second set of configuration files 306b. The processing device 402 can obtain these installation packages 402a-b (e.g., from a content repository) and store them in the memory device 404.

In some examples, the processing device 402 can execute a software installation tool (e.g., software installation tool 310 of FIG. 3) to install a first software product 414a from the first installation package 402a and a second software product 414b from the second installation package 402b. For example, the processing device 402 can obtain first configuration data 410a from the first set of configuration files 306a, second configuration data 410b from the second set of configuration files 306b, or both of these. The processing device 402 can then process (e.g., combine, merge, collocate, or delete information in) the first configuration data, the second configuration data, or both to generate a configuration dataset 408. After generating the configuration dataset 408, the processing device 402 can receive a user customization and apply the user customization to the configuration dataset 408 to create a customized version of the configuration dataset 412. The processing device 402 can install the first software product 414a from the first installation package 402a using the customized version of the configuration dataset 412. The processing device 402 can additionally or alternatively install the second software product 414b from the second installation package 402b using the customized version of the configuration dataset 412.

Figure 5:
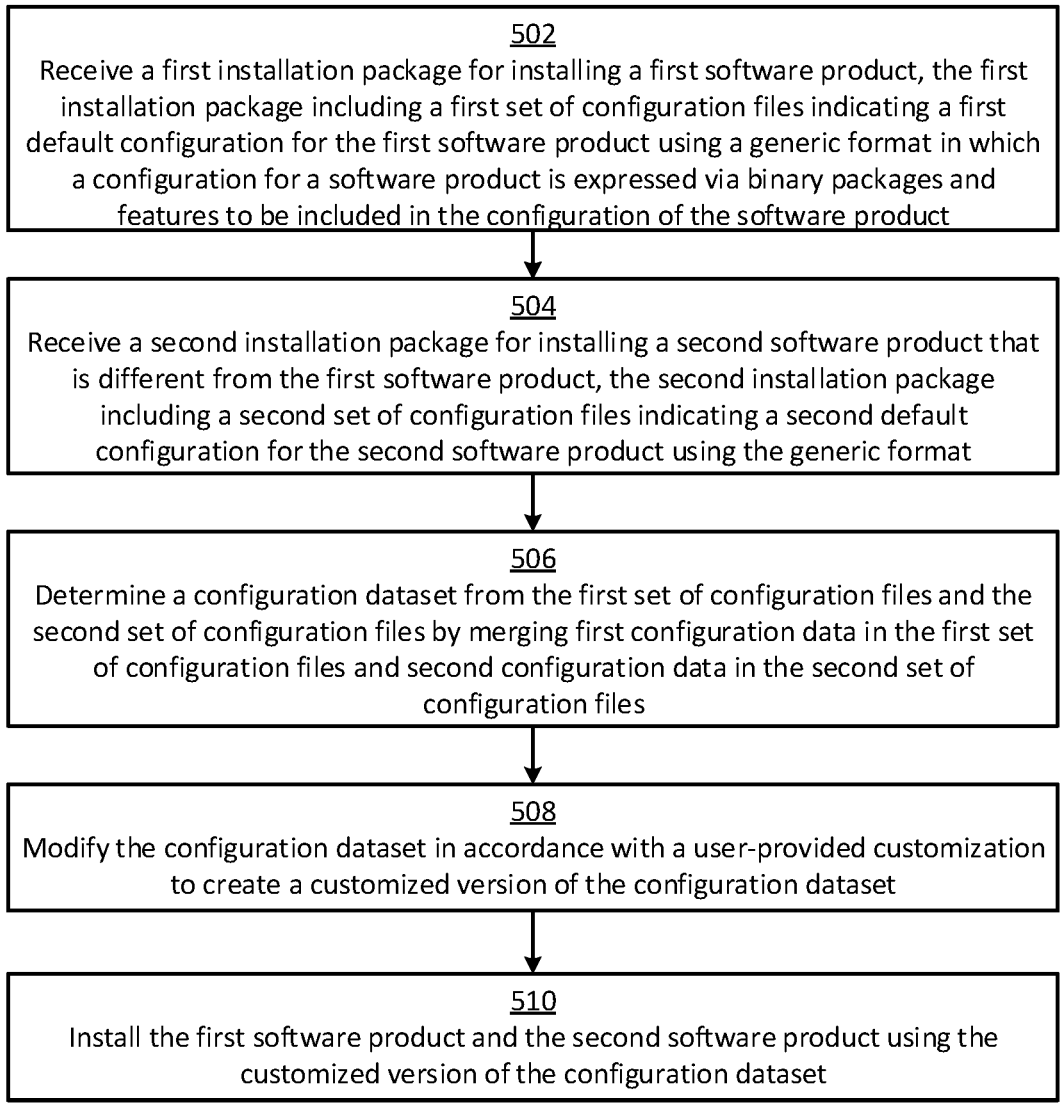
FIG. 5 is a flow chart of an example of a process for managing software installation according to some aspects.

FIG. 5 is a flow chart of an example of a process for managing software installation according to some aspects. Other examples can include more steps, fewer steps, different steps, or a different order of the steps than are depicted in FIG. 5. The steps of FIG. 5 are described with reference to the components discussed above with regard to FIG. 4.

In block 502, the processing device 402 receives a first installation package 402a for installing a first software product 414*a*. The first installation package 402*a* can include a first set of configuration files 306*a* indicating a first default configuration for the first software product 414*a* using a generic format. The generic format can express a configuration for a software product (e.g., the first software product 414*a*) via binary packages and features to be included in the configuration of the software product. In some examples, the generic format can express the configuration for the software product using tags arranged according to an extensible markup language (XML)-schema. The tags can indicate the binary packages and features to be included in the configuration for the software product.

In block 504, the processing device 402 receives a second installation package 402*b* for installing a second software product 414*b* that is different from the first software product 414*a*. The second installation package 402*b* can include a second set of configuration files 306*b* indicating a second default configuration for the second software product 414*b* using the generic format.

In block 506, the processing device 402 determines a configuration dataset 408 from the first set of configuration files 306*a* and the second set of configuration files 306*b* by merging first configuration data 410*a* in the first set of configuration files 306*a* and second configuration data 410*b* in the second set of configuration files 306*b*. The first configuration data 410*a* can include some or all of the data in the first set of configuration files 306*a*, and the second configuration data 410*b* can include some or all of the data in the second set of configuration files 406*b*.

In block 508, the processing device 402 modifies the configuration dataset 408 in accordance with a user-provided customization to create a customized version of the configuration dataset 412. For example, the processing device 402 can receive a user customization via a user input device, such as a mouse, keyboard, or touchscreen. The user customization can involve changing the value of a parameter or setting, deleting a feature, adding a feature, deleting a default package, adding a default package, deleting a dependency, adding a dependency, or any combination of these. The processing device 402 can modify the configuration dataset 408 to implement the received user-customization.

In block 508, the processing device 402 installs the first software product 414*a* and the second software product 414*b* using the customized version of the configuration dataset 412. In some examples, the processing device 402 can install the first software product 414*a* using a first plugin associated with the first installation package 402*a* to translate at least a portion of the customized version of the configuration dataset 412 into another format that is specific to the first software product 414*a*. Additionally or alternatively, the processing device 402 can install the second software product 414*b* using a second plugin associated with the second installation package 402*b* to translate at least a portion of the customized version of the configuration dataset 412 into another format that is specific to the second software product 414*b*.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

The invention claimed is:

1. A system comprising:
a processing device; and
a memory device including instructions that are executable by the processing device for causing the processing device to:
receive a first installation package for installing a first software product, the first installation package including a first set of configuration files indicating a first default configuration for the first software product using a generic format in which a configuration for a software product is expressed via binary packages and features to be included in the configuration of the software product;
receive a second installation package for installing a second software product that is different from the first software product, the second installation package including a second set of configuration files indicating a second default configuration for the second software product using the generic format;
determine a configuration dataset from the first set of configuration files and the second set of configuration files by merging first configuration data in the first set of configuration files and second configuration data in the second set of configuration files;
modify the configuration dataset in accordance with a user-provided customization to create a customized version of the configuration dataset; and
install the first software product and the second software product on a computing device using the customized version of the configuration dataset, the computing device being configured to execute the first software product and the second software product.

2. The system of claim 1, wherein the memory device further includes instructions that are executable by the processing device for causing the processing device to install the first software product and the second software product by:
installing the first software product using a first plugin associated with the first installation package to:
transform the customized version of the configuration dataset into a first product-specific format that is different from the generic format to create a first product-specific configuration file; and
installing the second software product using a second plugin associated with the second installation package to:
transform the customized version of the configuration dataset into a second product-specific format that is different from the generic format to create a second product-specific configuration file.

3. The system of claim 2, wherein:
the first plugin is included in the first installation package and is only configured to transform the customized version of the configuration dataset into the first product-specific format;
the second plugin is included in the second installation package and is only configured to transform the customized version of the configuration dataset into the second product-specific format;
the first installation package is a compressed archive of files; and
the second installation package is another compressed archive of files.

4. The system of claim 2, wherein:
the first plugin includes a first lookup table or a first set of rules for transforming the customized version of the configuration dataset into the first product-specific format; and
the second plugin includes a second lookup table or a second set of rules for transforming the customized version of the configuration dataset into the second product-specific format.

5. The system of claim 1, wherein the first set of configuration files includes:
a main-configuration file comprising:
dependency tags indicating at least one other installation package on which the first installation package depends;
property tags indicating at least one property value for the first software product in the first default configuration;
feature tags indicating a feature to be incorporated into the first default configuration, the feature being a set of configurable content; and
default-package tags indicating a content package to be included in the first software product by default;
a sub-configuration file for the feature to be incorporated into the first default configuration, the sub-configuration file comprising at least one parameter tag indicating a characteristic of a parameter associated with the feature; and
another sub-configuration file for the content package to be included in the software product by default, the other sub-configuration file comprising other dependency tags indicating at least one of (i) another installation package or (ii) another content package on which the content package depends.

6. The system of claim 1, wherein:
the generic format expresses the configuration for the software product using tags arranged according to an extensible markup language (XML)-schema, the tags indicating the binary packages and features to be included in the configuration of the software product; and
wherein the first set of configuration files includes:
a main-configuration file specifying a plurality of features to be included in the first default configuration, each feature in the plurality of features being a set of configurable content for enabling particular software functionality; and
sub-configuration files corresponding to the plurality of features, each sub-configuration file including XML-formatted content designating characteristics of a respective feature among the plurality of features.

7. The system of claim 1, wherein the memory device further includes instructions that are executable by the processing device for causing the processing device to, prior to installing the first software product and the second software product:
validate the customized version of the configuration dataset by confirming that the customized version of the configuration dataset satisfies one or more predefined criteria.

8. The system of claim 1, wherein the memory device further includes instructions that are executable by the processing device for causing the processing device to determine the configuration dataset by:
merging the first configuration data and second configuration data into a combined dataset;
deleting duplicate information in the combined dataset; and
collocating related information in the combined dataset.

9. A method comprising:
receiving, by a processing device, a first installation package for installing a first software product, the first installation package including a first set of configuration files indicating a first default configuration for the first software product using a generic format in which a configuration for a software product is expressed via binary packages and features to be included in the configuration of the software product;
receiving, by the processing device, a second installation package for installing a second software product that is different from the first software product, the second installation package including a second set of configuration files indicating a second default configuration for the second software product using the generic format;
determining, by the processing device, a configuration dataset from the first set of configuration files and the second set of configuration files by merging first configuration data in the first set of configuration files and second configuration data in the second set of configuration files;
modifying, by the processing device, the configuration dataset in accordance with a user-provided customization to create a customized version of the configuration dataset; and
installing, by the processing device, the first software product and the second software product on a computing device using the customized version of the configuration dataset, the computing device being configured to execute the first software product and the second software product.

10. The method of claim 9, further comprising installing the first software product using a plugin associated with the first installation package to transform the customized version of the configuration dataset into a first product-specific format that is different from the generic format and included in a first product-specific configuration file.

11. The method of claim 10, wherein:
the plugin is included in the first installation package; and
the first installation package is a compressed archive of files; and
the generic format expresses the configuration for the software product using tags arranged according to an extensible markup language (XML)-schema.

12. The method of claim 10, wherein the plugin includes a lookup table or a set of rules for transforming the customized version of the configuration dataset into the first product-specific format.

13. The method of claim 9, wherein the first set of configuration files includes a main-configuration file comprising:
dependency tags indicating at least one other installation package on which the first installation package depends;
property tags indicating at least one property value for the first software product in the first default configuration;
feature tags indicating a feature to be incorporated into the first default configuration, the feature being a set of configurable content; and
default-package tags indicating a content package to be included in the first software product by default.

14. The method of claim 9, further comprising determining the configuration dataset by:
- merging the first configuration data and second configuration data into a combined dataset; and
- collocating related information in the combined dataset.

15. A non-transitory computer-readable medium comprising program code that is executable by a processing device for causing the processing device to:
- receive a first installation package for installing a first software product, the first installation package including a first set of configuration files indicating a first default configuration for the first software product using a generic format in which a configuration for a software product is expressed via binary packages and features to be included in the configuration of the software product;
- receive a second installation package for installing a second software product that is different from the first software product, the second installation package including a second set of configuration files indicating a second default configuration for the second software product using the generic format;
- determine a configuration dataset from the first set of configuration files and the second set of configuration files by merging first configuration data in the first set of configuration files and second configuration data in the second set of configuration files;
- modify the configuration dataset in accordance with a user-provided customization to create a customized version of the configuration dataset; and
- install the first software product and the second software product on a computing device using the customized version of the configuration dataset, the computing device being configured to execute the first software product and the second software product.

16. The non-transitory computer-readable medium of claim 15, further including program code that is executable by the processing device for causing the processing device to install the first software product using a plugin associated with the first installation package, the plugin being configured to transform the customized version of the configuration dataset into a first product-specific format that is different from the generic format.

17. The non-transitory computer-readable medium of claim 16, wherein:
- the plugin is separate from the first installation package; and
- the first installation package is an archive of files.

18. The non-transitory computer-readable medium of claim 16, wherein:
- the plugin includes a lookup table or a set of rules for transforming the customized version of the configuration dataset into the first product-specific format; and
- the generic format expresses the configuration for the software product using tags arranged according to an extensible markup language (XML)-schema.

19. The non-transitory computer-readable medium of claim 15, wherein the first set of configuration files includes:
- a main-configuration file comprising:
  - dependency tags indicating at least one other installation package on which the first installation package depends;
  - property tags indicating at least one property value for the first software product in the first default configuration;
  - feature tags indicating a feature to be incorporated into the first default configuration, the feature being a set of configurable content; and
  - default-package tags indicating a content package to be included in the first software product by default; and
- a sub-configuration file for the feature to be incorporated into the first default configuration, the sub-configuration file comprising at least one parameter tag indicating a characteristic of a parameter associated with the feature.

20. The non-transitory computer-readable medium of claim 15, further including program code that is executable by the processing device for causing the processing device to determine the configuration dataset by:
- merging the first configuration data and second configuration data into a combined dataset; and
- deleting duplicate information in the combined dataset.

* * * * *